(12) United States Patent
Teramoto (10) Patent No.: US 8,928,954 B1
(45) Date of Patent: Jan. 6, 2015

(54) IMAGE READING DEVICE AND IMAGE FORMING DEVICE (71) Applicant: KYOCERA Document Solutions Inc., Osaka (JP)

(72) Inventor: Hideyuki Teramoto, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 14/303,100

(22) Filed: Jun. 12, 2014

(30) Foreign Application Priority Data

Jun. 13, 2013 (JP) ................................. 2013-124626

(51) Int. Cl.
*H04N 1/04* (2006.01)
*H04N 1/00* (2006.01)

(52) U.S. Cl.
CPC ....... *H04N 1/00596* (2013.01); *H04N 1/00782* (2013.01); *H04N 1/00692* (2013.01)
USPC ........... 358/474; 358/498; 358/496; 399/367; 271/145

(58) Field of Classification Search
CPC ............ H04N 2201/0081; H04N 1/12; H04N 1/00745; H04N 1/00588; H04N 2201/0471; H04N 2201/04756; H04N 1/00591; H04N 1/00602; H04N 1/00082; H04N 1/00681; H04N 1/00689; H04N 1/00692
USPC ......... 358/498, 474, 447, 494, 496, 504, 505, 358/509; 271/145, 264, 109, 10.03, 110, 271/117, 18, 226, 234, 244; 399/16, 393, 399/81, 9
See application file for complete search history.

(56) References Cited

U.S. PATENT DOCUMENTS

| | | | | |
|---|---|---|---|---|
| 6,151,478 A * | 11/2000 | Katsuta et al. | ................. | 399/372 |
| 6,594,039 B1 * | 7/2003 | Kanbayashi | ................... | 358/491 |
| 7,139,108 B2 * | 11/2006 | Andersen et al. | ............. | 358/474 |
| 7,561,311 B2 * | 7/2009 | Toyoda et al. | ................ | 358/474 |
| 7,813,012 B2 * | 10/2010 | Shingai | ......................... | 358/474 |
| 7,969,623 B2 * | 6/2011 | Kagami et al. | ................ | 358/498 |
| 8,064,109 B2 * | 11/2011 | Misu | ............................... | 358/496 |
| 8,477,391 B2 * | 7/2013 | Shimmachi et al. | .......... | 358/497 |
| 8,736,926 B2 * | 5/2014 | Suzuki et al. | ................. | 358/498 |
| 8,824,024 B2 * | 9/2014 | Kuno | ............................ | 358/475 |
| 8,860,989 B2 * | 10/2014 | Link et al. | .................... | 358/1.15 |

FOREIGN PATENT DOCUMENTS

JP        10-268442 A        10/1998

* cited by examiner

*Primary Examiner* — Negussie Worku
(74) *Attorney, Agent, or Firm* — Stein IP, LLC (57) ABSTRACT

Once the number of successive occurrences of document feed errors during execution of fed reading has reached a predetermined number of times, an image reading control portion of the image reading device performs stationary reading in cases in which a stationary-reading document detection portion detects the presence of the document, even when a document set detection portion detects that the document is present.

10 Claims, 7 Drawing Sheets

IMAGE READING DEVICE AND IMAGE FORMING DEVICE

INCORPORATION BY REFERENCE

This application is based upon and claims the benefit of priority from the corresponding Japanese Patent Application No. 2013-124626, filed Jun. 13, 2013, the entire contents of which are incorporated herein by reference.

BACKGROUND OF THE INVENTION

The present disclosure relates to an image reading device and an image forming device.

Image reading devices capable of executing fed reading, in which an image of a document is read while passed over a fed reading contact glass, and stationary reading, in which an image of a document is read while stationary on a stationary reading contact glass, are known in the prior art. Such image reading devices are provided with an image reading portion for optically reading an image of a document on the contact glass, and generating image data.

An image reading device capable of executing both fed reading and stationary reading is moreover provided with a document conveying unit for conveying the document over the fed reading contact glass. The document conveying unit is constituted by a document conveying path leading to a reading position (a position on the fed reading contact glass) during fed reading; a document set tray for setting a document to be advanced onto the document conveying path; feeding rollers for advancing the document to the document conveying path from the document set tray; conveying rollers for conveying the document once advanced to the document conveying path, and the like. The document set tray is furnished with a document set sensor for detecting whether or not a document has been set into the document set tray.

When, for example, an instruction to execute an image reading job has been received, in the event that a document has been set into the document set tray (in the event that the output level of the document sensor is a level indicating that a document is present), the document conveying unit feeds the document onto the fed reading contact glass, whereupon the image reading portion executes fed reading (but does not execute stationary reading). On the other hand, in the event that a document has not been set into the document set tray (in the event that the output level of the document sensor is a level indicating that a document is not present) at the time that an instruction to execute an image reading job is received, the document conveying unit does not feed the document. In this case, the image reading portion executes stationary reading.

SUMMARY OF THE INVENTION

The image reading device according to a first aspect of the present disclosure is provided with a contact glass and an image reading control portion. The image reading control portion executes fed reading for reading an image of the document passing over the contact glass while fed by a document conveying unit or stationary reading for reading an image of the document while stationary on the contact glass. The document conveying unit includes: a document conveying path for feeding the document onto the first contact glass; a document set tray which is set the document to be fed onto the document conveying path; a document set detection portion which detects the presence or absence of the document in the document set tray; a document feed portion which feeds the document from the document set tray to the document conveying path; and a document feed detection portion which detects the presence or absence of the document at a document feed detection position to the downstream side in the document feed direction from the document feed portion. The image reading device is moreover provided with a reception portion and a stationary-reading document detection portion. The reception portion accepts an instruction to execute an image reading job. The stationary-reading document detection portion detects whether or not the document is present on the contact glass. The image reading control portion, when the reception portion accepts the instruction to execute the image reading job, on a condition that the document set detection portion detects the presence of the document, performs fed reading, and on a condition that the document set detection portion detects the absence of the document and the stationary-reading document detection portion detects the presence of the document, performs stationary reading. Then, once the number of successive occurrences of document feed errors during execution of fed reading has reached a predetermined number, the image reading control portion performs stationary reading in the event that the stationary-reading document detection portion detects the presence of a document, even when the document set detection portion detects that the document is present.

The image forming device according to another aspect of the present disclosure is provided with the afore described image reading device.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

The image forming device provided with the image reading device is described below, taking the example of a multifunction device that incorporates multiple types of functions, such as a read function, a print function, a copy function, or the like.

(Overall Configuration of Image Forming Device)

Figure 1:
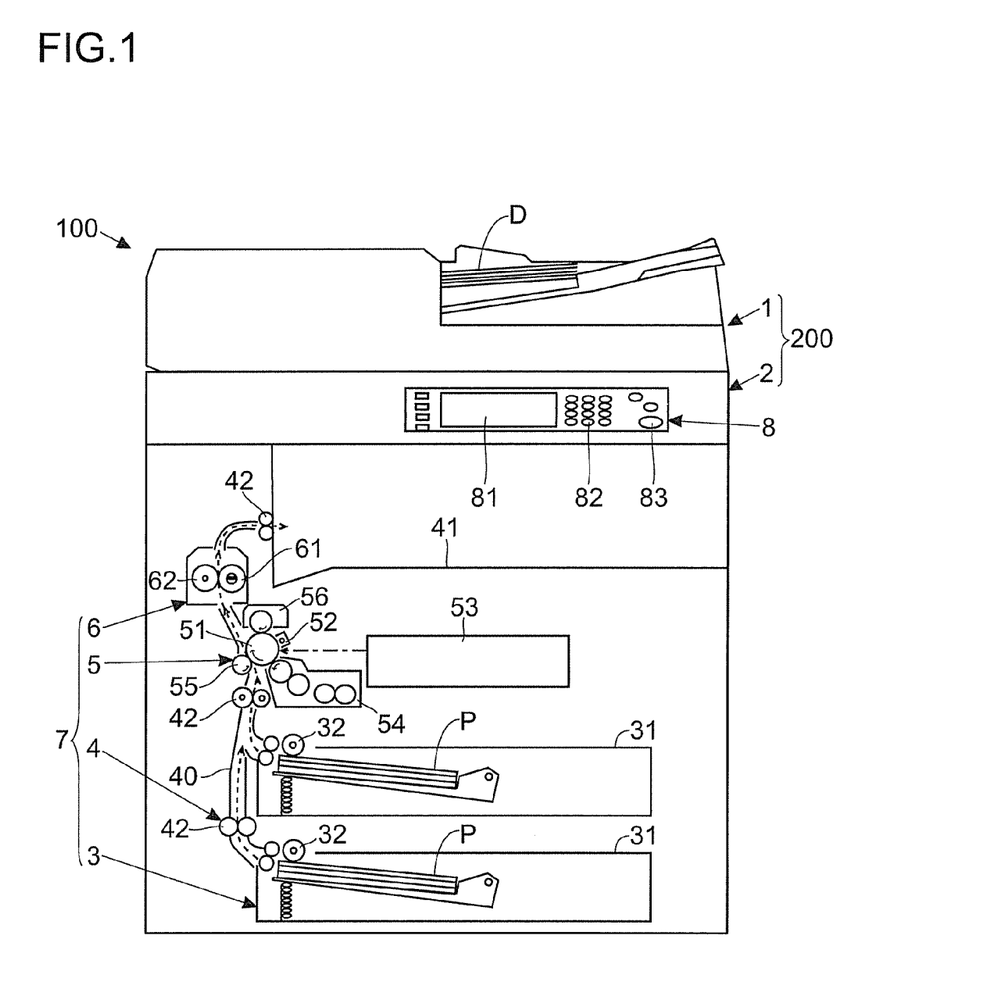
FIG. 1 is a schematic view of an image forming device provided with the image reading device according to an embodiment of the present disclosure.

As shown in FIG. 1, an image forming device 100 is provided with an image reading device 200 installed above a main unit. The image reading device 200 reads a document D and generates image data. The configuration of the image reading device 200 is described in detail below.

The image forming device 100 is provided with an engine portion 7 constituted by a paper feeding portion 3, a paper conveying portion 4, an image forming portion 5, and a fixing portion 6. The engine portion 7 outputs paper P on which an image has been printed on the basis of image data (for example, image data obtained by reading by the image reading device 200, or the like).

The paper feeding portion 3 includes feeding rollers 32, and feeds paper held within a cassette 31 to a paper conveying path 40. The paper conveying portion 4 includes conveying roller pair 42, and conveys the paper P advanced to the paper conveying path 40, doing so sequentially to a transfer nip and a fixation nip, then into a discharge tray 41.

The image forming portion 5 forms a toner image on the basis of image data, and transfers the toner image to the paper P. The image forming portion 5 includes a photosensitive drum 51, an electrostatic device 52, an exposure device 53, a developing device 54, a transfer roller 55, and a cleaning device 56. The fixing portion 6 includes a heating roller 61 and a pressure roller 62, which use heat and pressure to fix the toner image transferred to the paper P.

(Configuration of Image Reading Device)

Figure 2:
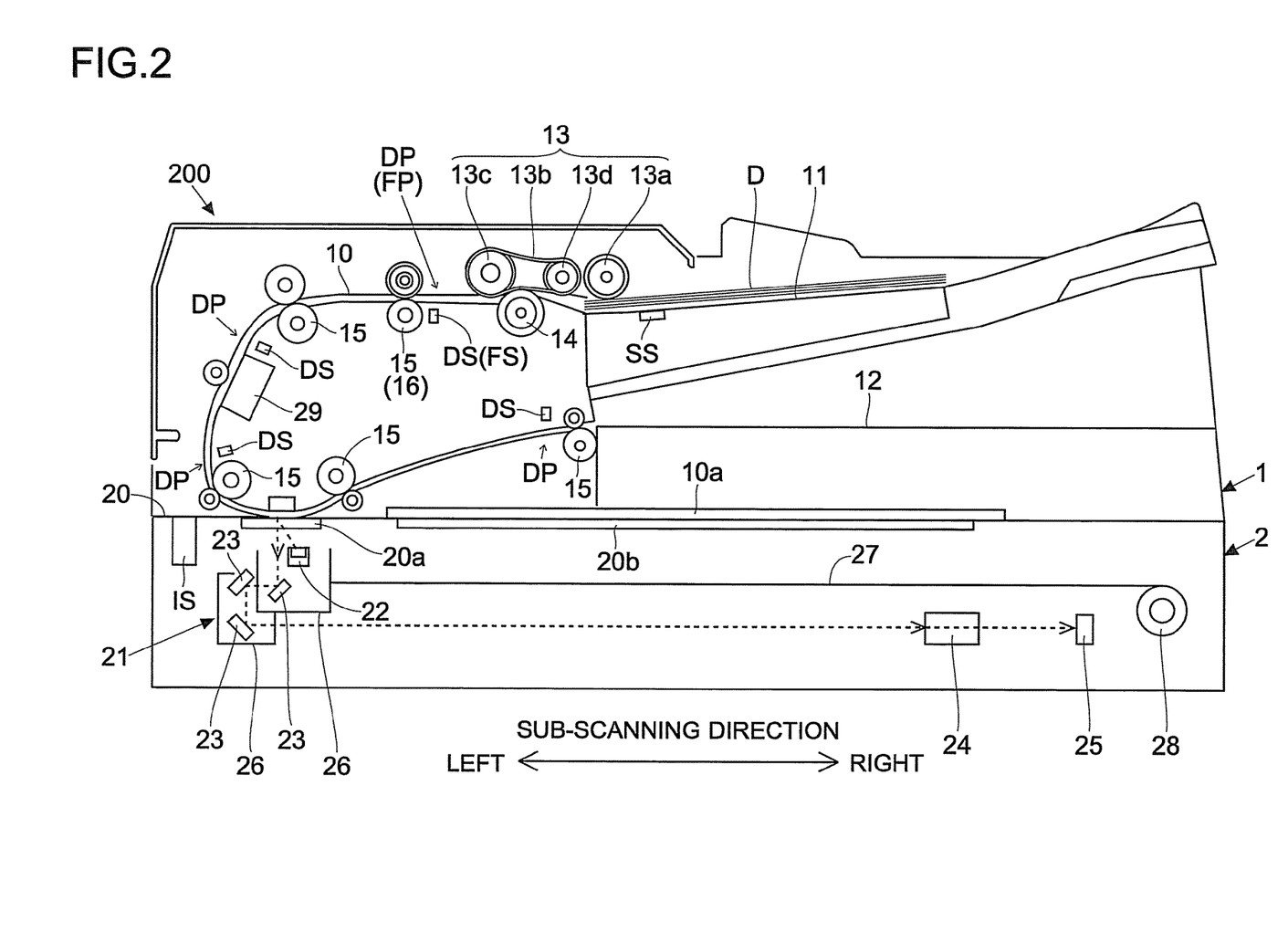
FIG. 2 is a detailed view of the image reading device provided to the image forming device shown in FIG. 1.

As shown in FIG. 2, the image reading device 200 has a contact glass 20a for fed reading and a contact glass 20b for stationary reading. The configuration of the image reading device 200 is such that it is possible to execute fed reading in which an image of the document D is read while passing over the contact glass 20a, and stationary reading in which an image of the document D is read while stationary on the contact glass 20b. The contact glass 20a corresponds to the "first contact glass" of the present disclosure, and the contact glass 20b corresponds to the "second contact glass" of the present disclosure.

As to the more specific configuration, the image reading device 200 has a reading bed 20 into which the contact glass 20a and the contact glass 20b are fitted, and is provided with a document conveying unit 1 attached in reclosable (hinged) fashion to the reading bed 20. When the document conveying unit 1 is closed, the contact glass 20a and the contact glass 20b are covered by the document conveying unit 1. Fed reading is executed with the document conveying unit 1 closed. In so doing, the document D conveyed by the document conveying unit 1 passes over the contact glass 20a. During execution of stationary reading, the document D stationary on the contact glass 20b can be pressed down thereagainst by closing the document conveying unit 1. A white mat 10a is arranged in a predetermined portion of the document conveying unit 1 facing the contact glass 20b.

The document conveying unit 1 additionally has a document conveying path 10 for the purpose of feeding the document D to a reading position (a position on the contact glass 20a) during fed reading. At one end of the document conveying path 10 is situated a document set tray 11 into which the document is set for advance the document conveying path 10. At the other end of the document conveying path 10 is situated a document discharge tray 12 into which is discharged the document D advancing along the document conveying path 10. A position midway along the document conveying path 10 serves as the reading position during fed reading. Consequently, as the document D is conveyed along the document conveying path 10, the document D passes over the contact glass 20a. At this time, one face of the document D (the face positioned facing upward when the document D was set into the document set tray 11) faces towards the contact glass 20a.

A document feed portion 13 is furnished at the upstream end, in the document feed direction, of the document conveying path 10. The document feed portion 13 feeds the document D that was set in the document set tray 11 to the document conveying path 10. The document feed portion 13 includes a pickup roller 13a for withdrawing the document D set into the document set tray 11, and a document feeding belt 13b for advancing the document D withdrawn from the document set tray 11 by the pickup roller 13a to the document conveying path 10. The document feeding belt 13b extends between a drive roller 13c and a driven roller 13d, and circulates as the drive roller 13c rotates (advancing the document D to the document conveying path 10).

The device is also furnished with a separating roller 14 at a position to the opposite from the document feed portion 13 (the document feeding belt 13b) with the document conveying path 10 therebetween. As the document D is advanced to the document conveying path 10 by the document feed portion 13, this separating roller 14 rotates in such a way as to advance the document D in the opposite direction from the document feed direction. In so doing, even when multiple stacked sheets of the document D are withdrawn from the document set tray 11, the multiple stacked sheets of the document D are separated one at a time.

To the downstream side in the document feed direction from the document feed portion 13, a plurality of conveying roller pairs 15 are furnished along the document conveying path 10. The plurality of conveying roller pairs 15 convey the document D at the downstream side in the document feed direction from the document feed portion 13. Of the plurality of conveying roller pairs 15, the conveying roller pair 15 closest to the document feed portion 13 constitute a resist roller pair 16. The resist roller pair 16 initially halt the advance of the document D in the document feed direction, then bend the document D to correct oblique motion of the document D.

The document conveying unit 1 is additionally furnished with a plurality of document detection sensors DS for respectively detecting the presence or absence of the document D at a plurality of detection positions DP on the document conveying path 10. The document detection sensors DS are constituted, for example, by reflection type optical sensors having a light-emitting part for emitting light towards a detection target, and a light-receiving part for receiving reflected light from the detection target. The output of the document detection sensors DS changes, depending on whether the document D is present or absent at any of the detection positions DP. The output of the document detection sensors DS may be employed, for example, to determine whether or not a paper jam has occurred, or to gauge the feed timing.

The output of one the document detection sensors DS that, of the plurality of document detection sensors DS, is that for detecting the presence or absence of the document D at the detection position DP between the document feed portion 13 and the resist roller pair 16 (the downstream side in the document feed direction from the document feed portion 13), is employed for determining whether or not a document feed error, whereby the document D fails to advance to the document conveying path 10, has occurred. In the following description, in some instances, this document detection sensor DS is designated as a document feed sensor FS, and the detection position DP of the document feed sensor FS is designated as a document feed detection position FP.

The document conveying unit 1 is furnished with a document set sensor SS for detecting the presence or absence of the document D in the document set tray 11. The document set sensor SS is constituted, for example, by an optical sensor having a light-emitting part, a light-receiving part, and an actuator that moves in a vertical direction between the light-emitting part and the light-receiving part, and that protrudes into an area above the document set tray 11 (an area into which the document D is set). When the document D is present in the document set tray 11, the actuator of the document set sensor SS, pressed by the document D, moves downward and blocks (or unblocks) the optical path between the light-emitting part and the light-receiving part. On the other hand, when the document D is absent from the document set tray 11, the actuator of the document set sensor SS, released from being pressed by the document D, moves upward and unblocks (or blocks) the optical path between the light-emitting part and the light-receiving part. In so doing, the output of the document set sensor SS changes according to whether the document D is present in or absent from the document set tray 11.

The image reading device 200 is provided with an image reading portion 2 for optically reading an image of the document D on the document bed 20. The image reading portion 2 includes a reading unit 21, the reading unit 21 being constituted by a lamp 22, a mirror 23, a lens 24, an image sensor 25, and the like.

The lamp 22 has a plurality of LED elements, and generates light to illuminate the document D. While not illustrated, the plurality of LED elements are arrayed in lines in a main scanning direction (a direction perpendicular to the plane of the page in FIG. 2), which is the read line direction. A cold cathode tube or the like could be used for the lamp 22 as well. When the document D passing over the contact glass 20a is read, the lamp 22 directs illuminating light towards the contact glass 20a (so that light transmitted through the contact glass 20a illuminates one face of the document D). On the other hand, when the document D stationary on the contact glass 20b is read, the lamp 22 directs illuminating light towards the contact glass 20b (so that light transmitted through the contact glass 20b illuminates one face of the document D). Reflected light reflected from the document D is reflected by the mirror 23, and is guided into the lens 24. The lens 24 focuses the reflected light.

The image sensor 25 receives the reflected light reflected from the document D (the light focused by the lens 24), thereby reading the document D in line units. This image sensor 25 comprises a CCD having a plurality of photoelectric conversion elements arranged in a line in the main scanning direction, and upon receiving reflected light, performs photoelectric conversion for each pixel in line units, and accumulates charge. The image sensor 25 then outputs an analog signal according to the accumulated charge. Specifically, the analog output for each pixel from the image sensor 25 changes according to the quantity of reflected light.

The lamp 22 and the mirror 23 are retained by a retaining member 26 which is moveable in a sub-scanning direction orthogonal to the main scanning direction. The retaining member 26 is linked to one end of a wire 27. The other end of the wire 27 is linked to a winding drum 28 that rotates to wind up the wire 27. In so doing, the retaining member 26 is moved in the sub-scanning direction through rotation of the winding drum 28, moving the lamp 22 and the mirror 23 in the sub-scanning direction together with the retaining member 26. In actual practice a plurality of the wires 27 are linked to the retaining member 26, with the plurality of wires 27 extending therefrom. In FIG. 2, for convenience, only the single wire 27 is illustrated.

In the case of reading an image of the document D while passing over the contact glass 20a, the retaining member 26 moves to below the contact glass 20a and comes to a halt. Thereafter, the document conveying unit 1 feeds the document D onto the contact glass 20a. At this time, the document D passing over the contact glass 20a is illuminated with light by the lamp 22, while the image sensor 25 sequentially performs repeated photoelectric conversion of reflected light reflected from the document D. In so doing, reading of an image of one face of the document D is performed in line units.

On the other hand, in the case of reading an image of the document D while stationary on the contact glass 20b, the retaining member 26 moves in the sub-scanning direction (a direction from left to right when viewed from the front). While the retaining member 26 is moving in the sub-scanning direction, the document D which is stationary on the contact glass 20b is illuminated with light by the lamp 22, while the image sensor 25 sequentially performs repeated photoelectric conversion of reflected light reflected from the document D. In so doing, reading of an image of one face of the document D is performed in line units.

The image reading portion 2 is additionally furnished with an open/closed detection sensor IS for the purpose of detecting when the incline of the document conveying unit 1 with respect to the document bed 20 reaches a previously established prescribed angle (for example, 35°). The open/closed detection sensor IS is constituted, for example, by an optical sensor having a light-emitting part, a light-receiving part, and an actuator that moves in a vertical direction between the light-emitting part and the light-receiving part, and that protrudes into an area above the document bed 20 (an area lying towards the document conveying unit 1). The open/closed detection sensor IS is situated in proximity to a hinge (not illustrated) that reclosably supports the document conveying unit 1. When the incline of the document conveying unit 1 is less than the prescribed angle, the actuator of the open/closed detection sensor IS, pressed by the document conveying unit 1, moves downward and blocks (or unblocks) the optical path between the light-emitting part and the light-receiving part. On the other hand, when the incline of the document conveying unit 1 is greater than the prescribed angle, the actuator of the open/closed detection sensor IS, released from being pressed by the document conveying unit 1, moves upward and unblocks (or blocks) the optical path between the light-emitting part and the light-receiving part. In so doing, the output of the open/closed detection sensor IS changes when the incline of the document conveying unit 1 has reached the prescribed angle.

The image reading device 200 is additionally furnished, apart from the reading unit 21 for reading one face of the document D, with a CIS unit 29 for reading the other face of the document D, on the opposite side from the one face. The CIS unit 29 is situated at a prescribed place along the document conveying path 10. In on doing, reading of both faces of the document D can be performed simultaneously.

Returning to FIG. 1, the image reading device 200 is provided with an operating panel 8. The operating panel 8 includes a liquid crystal display portion 81 with a touch panel. The liquid crystal display portion 81 displays soft keys for input of various settings and the like by the user, messages, and the like. The operating panel 8 is additionally furnished with hard keys, such as a 10-key 82, a start key 83, and the like.

(Hardware Configuration of Image Forming Device (Image Reading Device))

Figure 3:
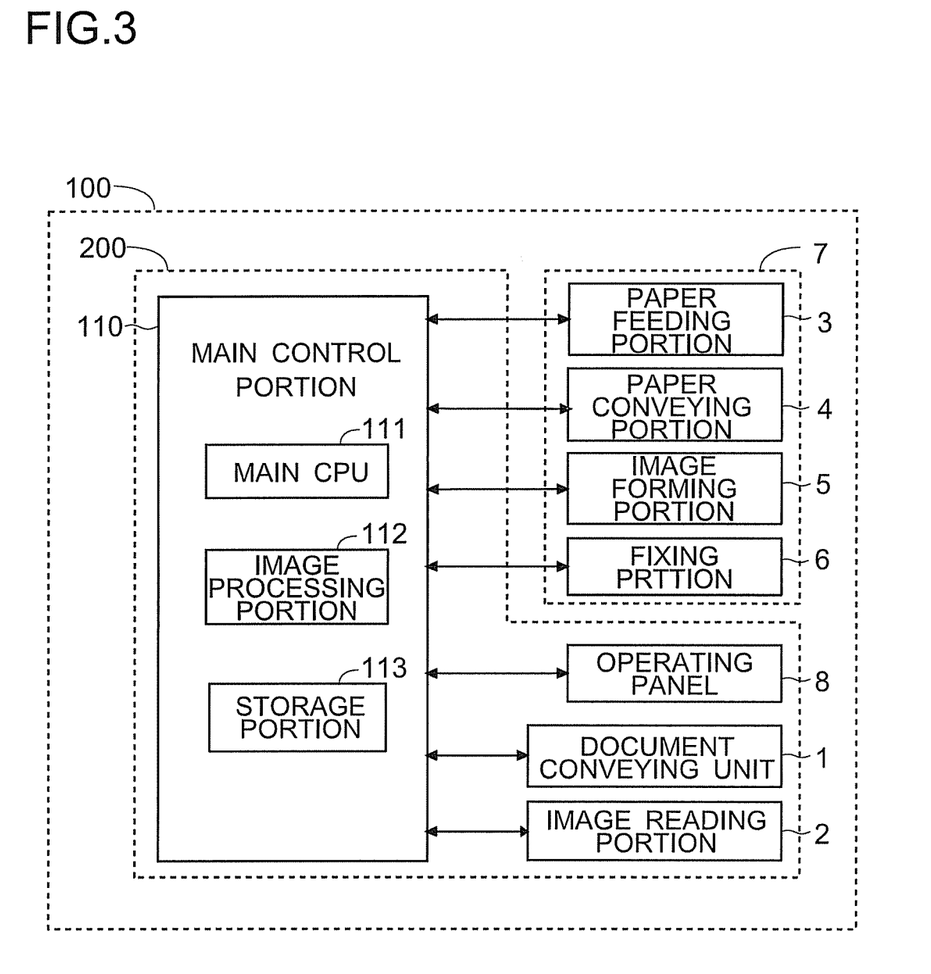
FIG. 3 is a block diagram describing the hardware configuration of the image forming device (image reading device) shown in FIG. 1.

As shown in FIG. 3, the image forming device 100 (image reading device 200) is provided with a main control portion 110. The main control portion 110 includes a main CPU 111, an image processing portion 112, and a storage portion 113. The image processing portion 112 is constituted by an ASIC for dedicated image processing or the like, and carries out image processing (enlargement/reduction, density conversion, data format conversion, and the like) on image data. The storage portion 113 comprises ROM and RAM or the like, and stores programs and data. On the basis of the programs and data stored in the storage portion 113, the main control portion 110 performs overall control of the image forming device 100.

Figure 4:
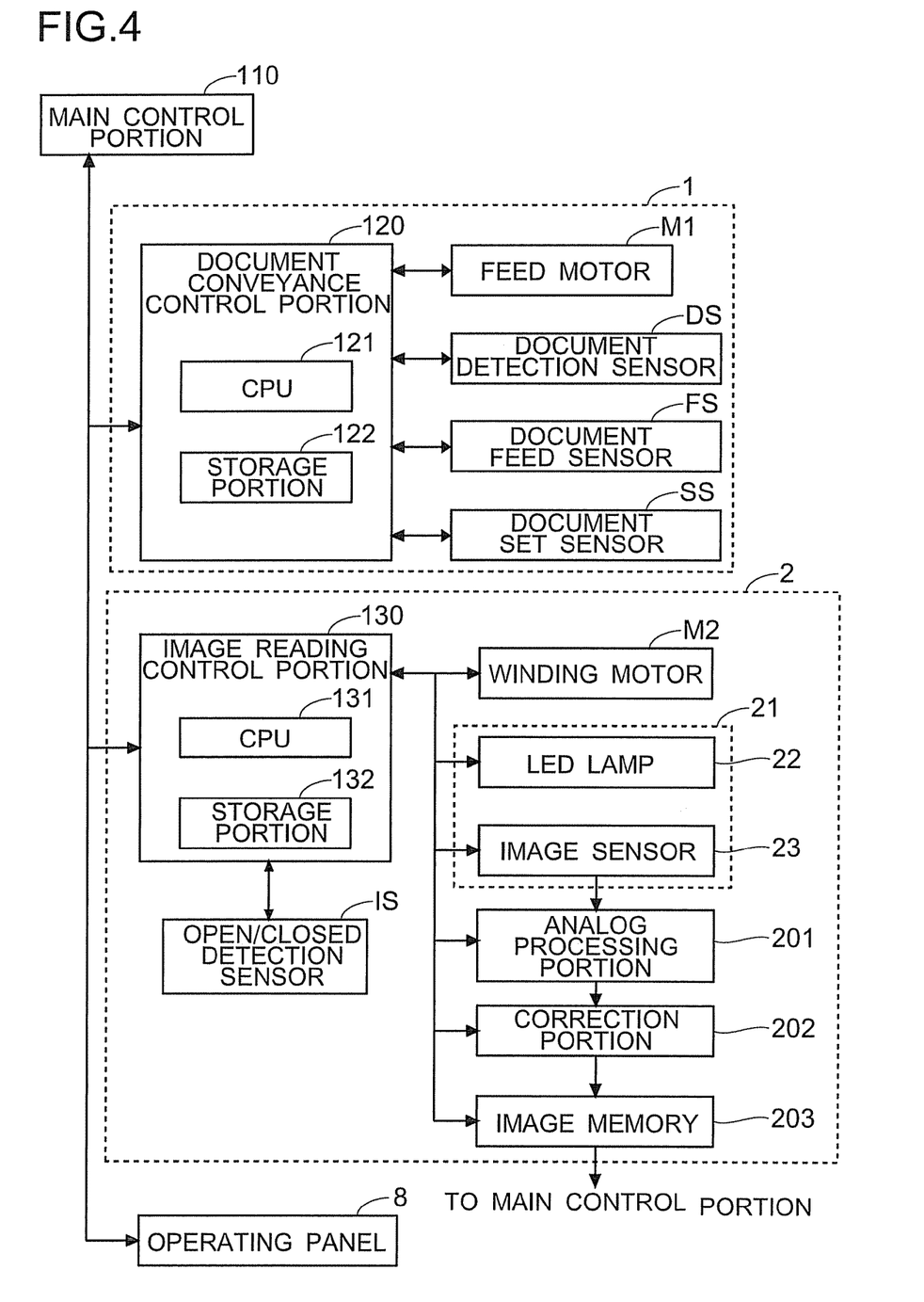
FIG. 4 is a block diagram describing the hardware configuration of the image forming device (image reading device) shown in FIG. 1.

As shown in FIG. 4, the main control portion 110 is connected to a document conveyance control portion 120. The document conveyance control portion 120 includes a CPU 121 and a storage portion 122. The document conveyance control portion 120 receives instructions from the main control portion 110, and controls document conveyance which is executed by the document conveying unit 1.

In specific terms, the document conveyance control portion 120 is connected to a feed motor M1 for the purpose of prompting rotation of the rotating elements installed in the document conveying unit 1, and prompts the rotating elements of the document conveying unit 1 to rotate in appropriate fashion. While the motor for rotating the document feed portion 13 (the pickup roller 13a and the paper advance roller 13c) and the separating roller 14, the motor for rotating the resist roller pair 16, and the motor for rotating the conveying roller pairs 15 other than the resist roller pair 16 are different from one another, for convenience, these motors are all designated as the feed motor M1.

The document conveyance control portion 120 is connected to the document detection sensors DS (including the document feed sensor FS), and on the basis of the output of the document detection sensors DS, detects the presence or absence of the document D at the detection positions DP (including the document feed detection position FP) on the document conveying path 10. The document conveyance control portion 120 then determines whether or not a paper jam has occurred on the document conveying path 10, and gauges the feed timing of the document D. In addition to this, on the basis of the output of the document feed sensor FS, the document conveyance control portion 120 detects the presence or absence of the document D at the document feed detection position FP, and determines whether or not a document feed error, whereby the document D fails to advance to the document conveying path 10, has occurred. In this configuration, the document conveyance control portion 120 corresponds to the "document feed detection portion" of the present disclosure.

The document conveyance control portion 120 is further connected to the document set sensor SS, and on the basis of the output of the document set sensor SS, detects the presence or absence of the document D in the document set tray 11. In this configuration, the document conveyance control portion 120 corresponds to the "document set detection portion" of the present disclosure.

The main control portion 110 is connected to an image reading control portion 130. The image reading control portion 130 includes a CPU 131 and a storage portion 132. The image reading control portion 130 receives instructions from the main control portion 110, and controls image reading which is executed by the image reading portion 2.

In specific terms, the image reading control portion 130 is connected to a winding motor M2 for the purpose of prompting rotation of the winding drum 28, and prompts the winding drum 28 to rotate in appropriate fashion. Specifically, the image reading control portion 130 moves the retaining member 26 in the sub-scanning direction, and controls the reading position of the reading unit 21 (the position of illumination by the lamp 22). The image reading control portion 130 is also connected to the reading unit 21 (the lamp 22 and the image sensor 24), and controls the operations of the lamp 22 and the image sensor 24. In order for the image reading control portion 130 to process the output of the reading unit 21 (the analog outputs from the image sensor 24), it is connected to an analog processing portion 201, a correction portion 202, and an image memory 203.

The analog processing portion 201 includes an amplifier circuit, an ND conversion circuit, and the like. The analog processing portion 201 amplifies the analog outputs from the image sensor 24, and converts these to digital image data for output. The correction portion 202 performs corrections, such as shading correction and the like. The image memory 203 accumulates image data, which is transferred to the main control portion 110 (the image processing portion 112). Having received the image data, the main control portion 110 (the image processing portion 112) now carries out image processing on the image data, generating image data for exposure (data employed for switching on and off the light emitting elements of the exposure device 53). The main control portion 110 then outputs the image data for exposure to the engine portion 7.

The image reading control portion 130 is connected to the open/closed detection sensor IS, and on the basis of the output of the open/closed detection sensor IS, detects whether or not the incline of the document conveying unit 1 has reached the prescribed angle. Then, when the incline of the document conveying unit 1 has reached the prescribed angle (just prior to the document conveying unit 1 being fully closed), the image reading control portion 130 detects the size of the document D stationary on the contact glass 20b.

When the image reading control portion 130 performs document size detection, it prompts the reading unit 21 to read an image on the contact glass 20b at a previously established document size detection position (the left edge part of the contact glass 20b in the sub-scanning direction), and acquires the image data obtained thereby, as image data for document size detection. Then, making reference to the image data for document size detection, the image reading control portion 130 identifies boundaries between light pixel data (pixel data indicating the presence of the document D) and dark pixel data (pixel data indicating the absence of the document D), to ascertain the size of the document D. By performing document size detection in this manner, it can be determined whether or not the document D is present on the contact glass 20b. The reason for performing document size detection before the document conveying unit 1 is fully closed is that when the document conveying unit 1 is fully closed, the white mat 10a will be mistakenly recognized as the document D, so that the boundary between the portion in which the document D is present and the portion in which the document D is absent cannot be read accurately.

The main control portion 110 is connected to the operating panel 8, and controls display operations of the operating panel 8, as well as detecting operations performed from the operating panel 8 by the user. For example, in the event that the user performs an operation to push the start key 83, the operating panel 8 receives the pushing operation as an instruction to execute an image reading job. Then, once the operating panel 8 receives the instruction to execute an image reading job, the main control portion 110 prompts the document conveying unit 1 and the image reading portion 2 to execute the image reading job. In this configuration, the operating panel 8 corresponds to the "reception portion" in the present disclosure. The operating panel 8 also receives instructions to execute print jobs for execution by the engine portion 7. Specifically, the operating panel 8 is not employed exclusively for the image reading device 200.

(Overview of Image Reading Job)

The operating panel 8 receives from the user a selection instruction as to which of plurality of functions is to be used (the read function, the print function, the copy function, or the like). Then, when the operating panel 8 has received the instruction selecting the read function, and the operating panel 8 has moreover received an instruction to execute the job, the main control portion 110 prompts the document conveying unit 1 and the image reading portion 2 to initiate the image read job, due to the operating panel 8 having received the instruction to execute the job. At this time, in the event that the document D has been set into the document set tray 11, the main control portion 110 prompts the document conveying unit 1 to perform document feed, and the image reading portion 2 to perform a fed read. On the other hand, in the event that the document D has not been set into the document set tray 11, the main control portion 110 prompts the image reading portion 2 to perform a stationary read (the document conveying unit 1 is not prompted to perform document feed).

Specifically, when the operating panel 8 receives the instruction to execute an image reading job, in the event that the document conveyance control portion 120, on the basis of the output of the document set sensor SS, detects that the document D is present within the document set tray 11, it prompts the document feed portion 13 to initiate a document feed operation in order to advance the document D from the document set tray 11 to the document conveying path 10. The document conveyance control portion 120 also prompts the conveying roller pairs 15 to perform a feed operation in order to feed the document along the document conveying path 10. In so doing, the document D is fed to the reading position (a position on the contact glass 20a) during a fed read. The image reading control portion 130 then moves the lamp 22 to below the contact glass 20a, and prompts the reading unit 21 to read an image of the document D passing over the contact glass 20a (the image reading unit 2 performs a fed read).

Additionally, when the operating panel 8 receives the instruction to execute an image reading job, in the event that the document conveyance control portion 120, on the basis of the output of the document set sensor SS, detects that the document D is absent from the document set tray 11, it does not prompt the document feed portion 13 to initiate a document feed operation, and does not prompt the conveying roller pairs 15 to perform a feed operation. In this case, the image reading control portion 130, while moving the lamp 22 in the sub-scanning direction to below the contact glass 20b, prompts the reading unit 21 to read an image of the document D which is stationary on the contact glass 20b (the image reading unit 2 performs a fed read).

(Detection of Occurrence of Document Feed Errors)

Subsequent to initiation of the document feed operation, the document conveyance control portion 120, on the basis of the output of the document feed sensor FS, determines whether a document feed error, whereby the document D fails to advance to the document conveying path 10, has occurred. In specific terms, in the event that, within a previously established prescribed time interval starting at initiation of the document feed operation, the document conveyance control portion 120 detects that the document D is present at the document feed detection position FP, it determines paper advance to have taken place normally. The prescribed time interval refers to a prescribed time interval needed for the document D advanced from the document set tray 11 to the document conveying path 10 to reach the document feed detection position FP.

On the other hand, in the event that the document conveyance control portion 120 does not detect that the document D is present at the document feed detection position FP within the previously established prescribed time interval starting at initiation of the document feed operation, it temporarily halts the document feed operation, then resumes the document feed operation (prompts the document feed portion 13 to initiate a retry operation). Then, in the event that the document conveyance control portion 120 does not detect that the document D is present at the document feed detection position FP even after the number of successively executed retry operations has reached a previously established number (for example, five), it determines a document feed error to have occurred.

Figure 5:
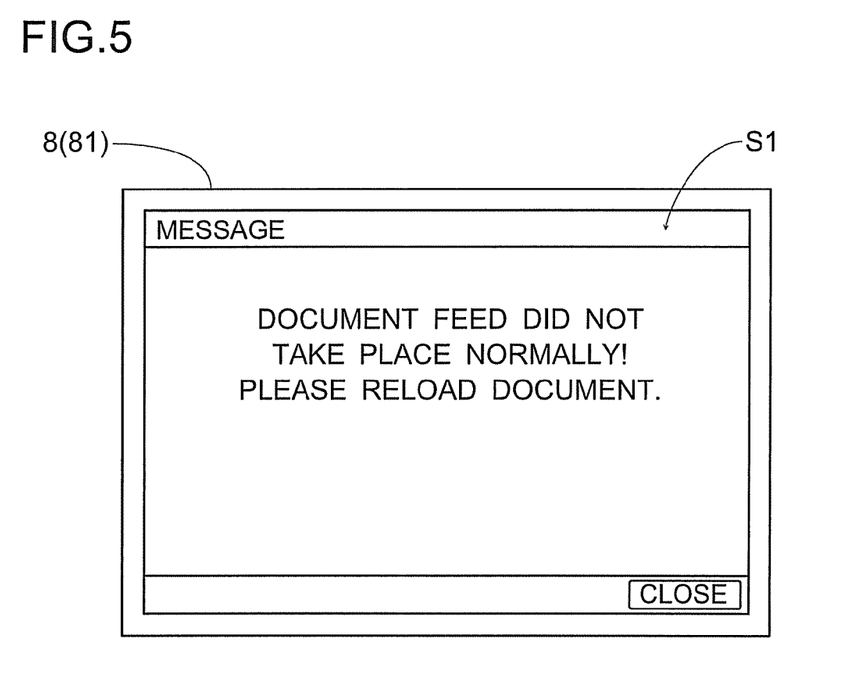
FIG. 5 is a diagram of a notification screen (screen notifying that a document feed error has occurred) displayed on the image forming device (image reading device) shown in FIG. 1.

When a document feed error has occurred, the document conveyance control portion 120 alerts the main control portion 110 to the effect that the document feed error has occurred. Having received this alert, the main control portion 110 prompts the operating panel 8 to display a notification screen S1 (see FIG. 5) containing a message to the effect that the document feed error has occurred, or the like. For example, as shown in FIG. 5, a message providing a notification to reload the document D is displayed on the operating panel 8. Possible causes of document feed errors could include wear of the document feed portion 13 (the pickup roller 13a and the document feeding belt 13b), paper dust deposited on the document feed portion 13, or the like. Consequently, while not illustrated, a message prompting replacement (or cleaning) of the document feed portion 13 may be displayed. The document conveyance control portion 120 saves the number of times that document feed errors occur, to the storage portion 122.

(Detection of Document Set Sensor Malfunction)

When the document set sensor SS experiences a malfunction, there may be instances in which the output level of the document set sensor SS remains at the same level indicating that the document D is present. For example, when the actuator of the document set sensor SS is poorly attached (slides poorly), the actuator may fail to move despite the absence of the document D from the document set tray 11, and remain at the same location as when the document D is present in the document set tray 11, whereby the output level of the document set sensor SS remains at the same level indicating that the document D is present. Or, in the event that the document set sensor SS has failed, the output level of the document set sensor SS may remain at the same level indicating that the document D is present.

In a case in which such a malfunction has occurred in the document set sensor SS, when the user desiring to perform a stationary read stations the document D on the contact glass 20b, and performs on the operating panel 8 an instruction to execute an image reading job, despite the fact that the document D has not been set into the document set tray 11, the document conveying unit 1 will initiate document feed (initiate the document feed operation by the document feed portion 13), because the output level of the document set sensor SS remains at the level indicating that the document D is present. At this time, because the document D has not been set into the document set tray 11, the document D cannot be advanced onto the document conveying path 10, and a document feed error occurs (the operating panel 8 displays the notification screen 81 shown in FIG. 5). Consequently, from the standpoint of the user desiring to perform a stationary read, the fact that the stationary read fails to be executed poses an inconvenience. Furthermore, because the user is not aware that a malfunction has occurred in the document set sensor SS, when a document feed error occurs despite the fact that the document D is not set into the document set tray 11, he or she will not be able to ascertain what countermeasures to take.

Consequently, according to the present embodiment, it is detected whether or not a malfunction has occurred in the document set sensor SS. Then, in the event that a malfunction has occurred in the document set sensor SS, even when the output level of the document set sensor SS is a level indicating that the document D is present, stationary reading is executed, without displaying the notification screen S1 shown in FIG. 5. Furthermore, notification is made to the effect that a malfunction has occurred in the document set sensor SS. For example, when the document conveyance control portion 120 has detected a predetermined number (for example, 2 to 3) of successive document feed errors, the main control portion 110 prompts the image reading portion 2 (the image reading control portion 130) to perform a process to detect whether or not a malfunction has occurred in the document set sensor SS.

In specific terms, when the number of successive occurrences of document feed errors has reached a predetermined number, the image reading control portion 130 refers to the image data for document size detection acquired during the most recent document size detection, and detects whether or not the document D is present on the contact glass 20*b*. In this configuration, the image reading control portion 130 corresponds to the "stationary-reading document detection portion" of the present disclosure. For example, in a case in which the document D has been stationed on the contact glass 20*b* and the document conveying unit 1 has been closed, the image data for document size detection will be composed of light pixel data (pixel data indicating the presence of the document D) and dark pixel data (pixel data indicating the absence of the document D). On the other hand, in a case in which the document D has been removed from over the contact glass 20*b* and the document conveying unit 1 has been closed, the image data for document size detection will be composed of dark pixel data (pixel data indicating the absence of the document D) only. Thus, by referring to the image data for document size detection, it can be detected whether or not the document D is present on the contact glass 20*b*. The image reading control portion 130 then alerts the main control portion 110 of the result of detection of whether or not the document D is present on the contact glass 20*b*.

Normally, a user wishing to execute a fed read will set the document D into the document set tray 11, rather than stationing the document D on the contact glass 20*b*. On the other hand, a user wishing to execute a stationary read will station the document D on the contact glass 20*b*, rather than setting the document D into the document set tray 11.

Consequently, in a case in which the image reading control portion 130 has detected the presence of the document D on the contact glass 20*b*, it is expected that, because a document feed operation was initiated despite the document D not being seted into the document set tray 11, the document conveyance control portion 120 will detect the occurrence of a document feed error. Specifically, in this case, it is expected that, despite the fact that the document D was not seted in the document set tray 11, the document conveyance control portion 120 will detect the presence of the document D in the document set tray 11 (the output level of the document set sensor SS will be at a level indicating that the document D is present). For this reason, when the main control portion 110 receives from the image reading control portion 130 a detection result to the effect that the document D is present on the contact glass 20*b*, it determines that a malfunction has occurred in the document set sensor SS.

Figure 6:
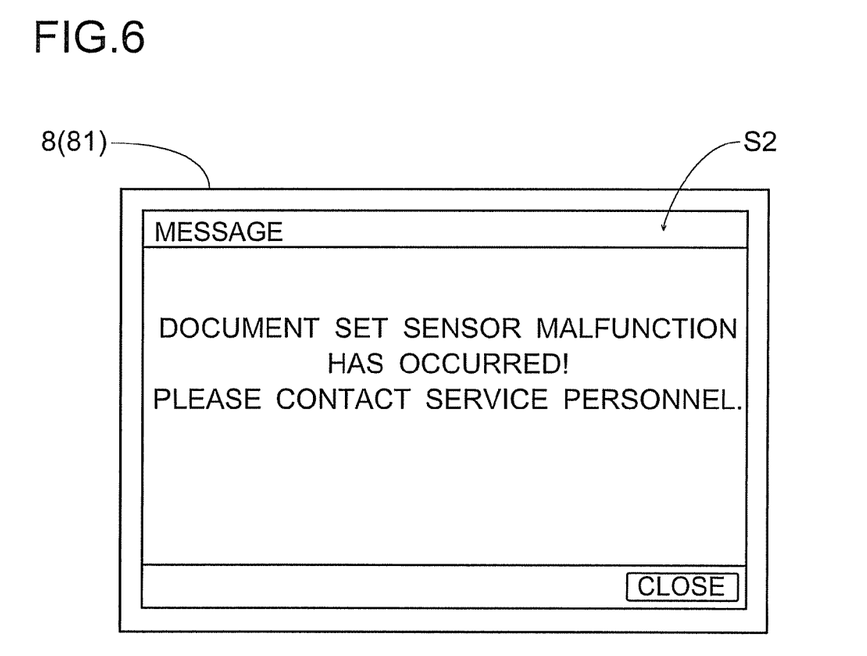
FIG. 6 is a diagram of a notification screen (screen notifying that a malfunction has occurred in the document set sensor) displayed on the image forming device (image reading device) shown in FIG. 1.

Subsequently, even when the document conveyance control portion 120 has detected the presence of the document D in the document set tray 11, the main control portion 110 does not prompt the paper feed unit 1 to perform document feed (document feed operation by the document feed portion 13), and instead prompts the image reading portion 2 (the image reading control portion 130) to perform stationary reading. The notification screen S2 containing a message or the like, to the effect that a malfunction has occurred in the document set sensor SS (see FIG. 6) is displayed on the operating panel 8. For example, a message advising the user to contact service personnel is displayed on the operating panel 8, as shown in FIG. 6. In this configuration, the operating panel 8 corresponds to the "notification portion" of the present disclosure.

On the other hand, in a case in which the image reading control portion 130 has detected that the document D is absent from the contact glass 20*b*, it is expected that, because a document feed operation was initiated due to the document D being set into the document set tray 11, but for some reason the document D was not advanced to the document conveying path 10, the document conveyance control portion 120 will detect occurrence of a document feed error. Specifically, in this case, it is expected that, due to the document D being set into the document set tray 11, the document conveyance control portion 120 will detect that the document D is present in the document set tray 11 (the output level of the document set sensor SS will be at a level indicating that the document D is present). For this reason, when the main control portion 110 receives from the image reading control portion 130 a detection result to the effect that the document D is absent from the contact glass 20*b*, it determines that no malfunction has occurred in the document set sensor SS.

Reasons having to do with the manner in which the document D was set into the document set tray 11, or the like, are conceivable reasons why a document feed error would occur in this case. Therefore, the main control portion 110 displays the notification screen S1 like that shown in FIG. 5 on the operating panel 8.

Figure 7:
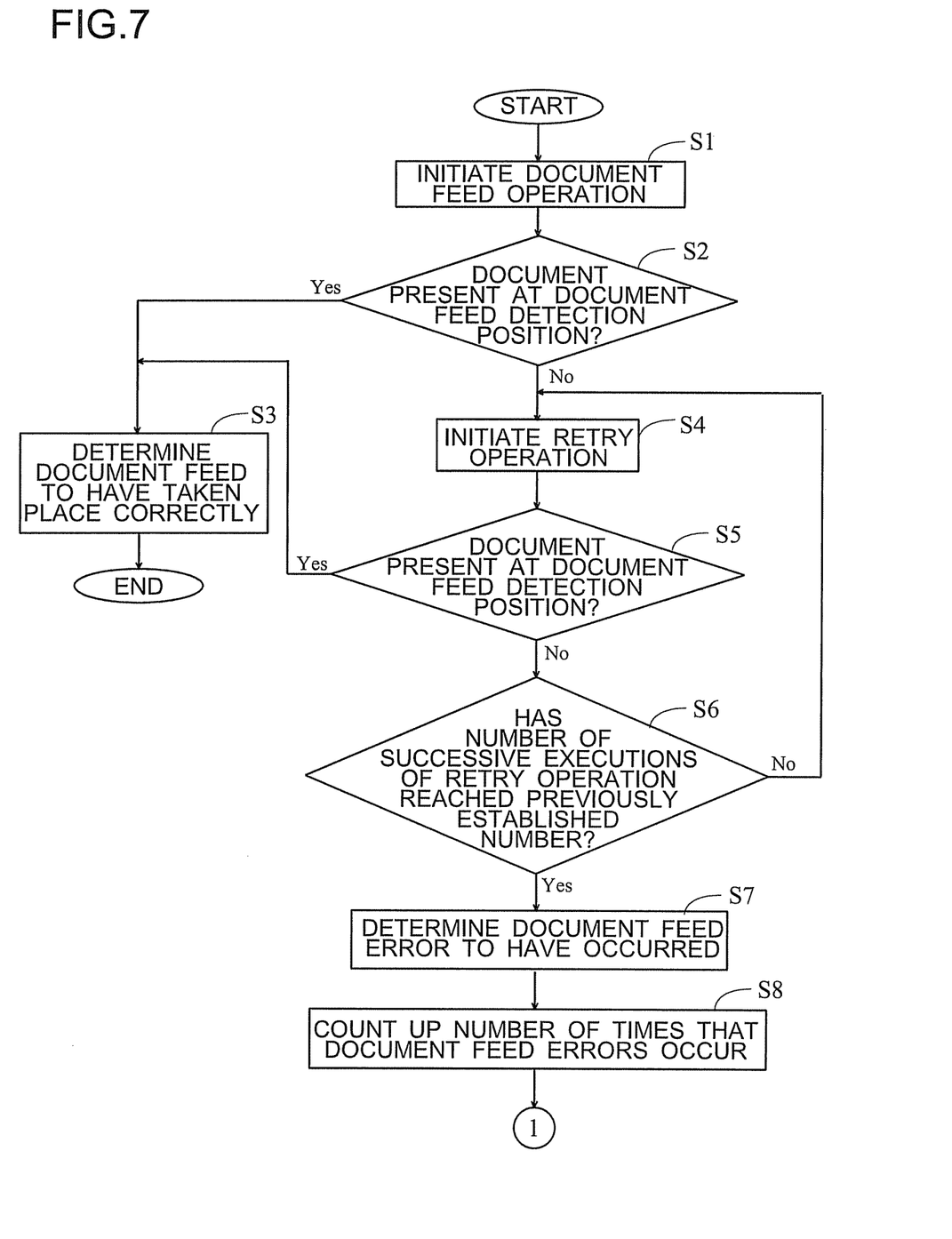
FIG. 7 is a flowchart describing the flow of detecting occurrence of a malfunction of the document set sensor, performed in the image forming device (image reading device) shown in FIG. 1.
Figure 8:
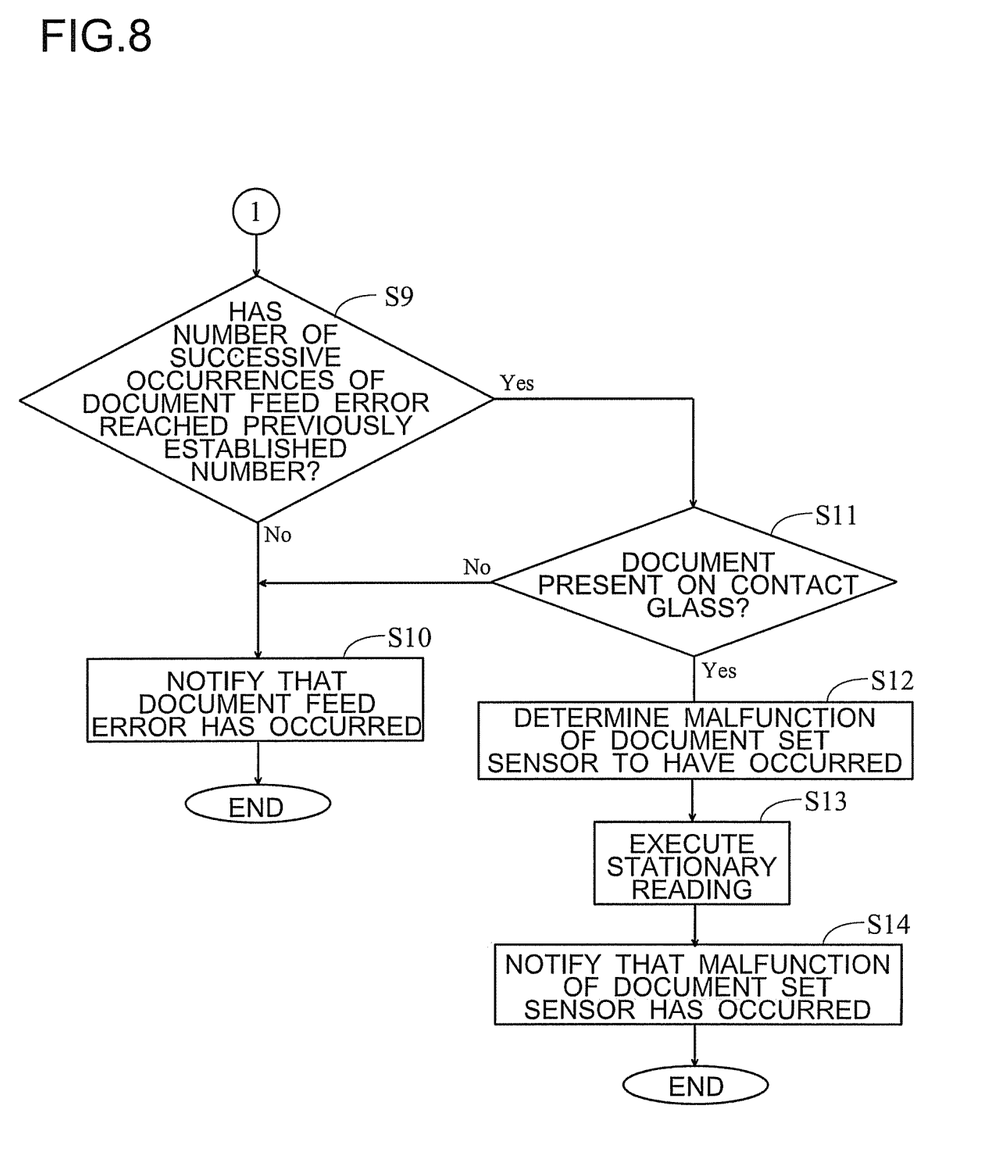
FIG. 8 is a flowchart describing the flow of detecting occurrence of a malfunction in the document set sensor, performed in the image forming device (image reading device) shown in FIG. 1.

The following description of the flow of document set sensor SS malfunction detection makes reference to the flowchart in FIGS. 7 and 8.

Firstly, at the starting point of the flowchart in FIGS. 7 and 8, the document conveyance control portion 120 has detected the presence of the document D in the document set tray 11 (the output level of the document set sensor SS is at a level indicating that the document D is present). Specifically, in this state, when the operating panel 8 receives an instruction to execute an image reading job, the document conveying unit 1 performs document feeding, and the image reading portion 2 performs fed reading. The flowchart in FIGS. 7 and 8 then starts when the operating panel 8 has received the instruction to execute an image reading job.

In Step S1, the main control portion 110 issues instructions to the document conveyance control portion 120, prompting the document conveying unit 1 to initiate document feeding. Specifically, the document feed portion 13 initiates the document feed operation. In Step S2, the document conveyance control portion 120 determines whether or not the presence of the document D has been detected at the document feed detection position FP, within a previously established prescribed time interval from initiation of the document feed operation. In the event that, as a result, the document D is detected to be present at the document feed detection position FP, the flow advances to Step S3. Upon advancing to Step S3, the document conveyance control portion 120 determines paper advance to have taken place correctly.

In a case in which the presence of the document D is not detected at the document feed detection position FP in Step S2, the flow advances to Step S4. Upon advancing to Step S4, the document conveyance control portion 120 initiates a retry operation by the document feed portion 13. Then, in Step S5, the document conveyance control portion 120 initiates a document feed operation (retry operation), and determines whether or not the document D is detected to be present at the document feed detection position FP within a prescribed time interval thereafter. As a result, in the event that the presence of the document D at the document feed detection position FP is detected, the flow advances to Step S3, or in the event that the presence of the document D at the document feed detection position FP is not detected, the flow advances to Step S6.

Upon advancing to Step S6, the document conveyance control portion 120 determines whether or not the number of times the retry operation was executed in succession has reached a previously established number. As a result, in the event that the number of times the retry operation was executed in succession has not yet reached the previously established number, the flow advances to Step S4, whereas in the event that the number of times the retry operation was executed in succession has reached the previously established number, the flow advances to Step S7. Upon advancing to Step S7, the document conveyance control portion 120 determines that a document feed error has occurred, and alerts the main control portion 110 to the effect that the document feed error has occurred.

The flow advances from Step S7 to Step S8, and the document conveyance control portion 120 counts up the number of times that document feed errors have occurred (updating the number of times that document feed errors have occurred, stored in the storage portion 122). Thereafter, in Step S9, the document conveyance control portion 120 determines whether or not the number of times that document feed errors have occurred in succession has reached a previously established number. As a result, in the event that the number of times that document feed errors have occurred in succession has not yet reached the previously established number, the flow advances to Step S10. Upon advancing to Step S10, the document conveyance control portion 120 alerts the main control portion 110 that the number of times that document feed errors have occurred in succession has not yet reached the previously established number. Upon being so alerted, the main control portion 110 prompts the operating panel 8 to make notification that a document feed error has occurred (to display the notification screen 81 shown in FIG. 5).

In a case in which, in Step S9, the number of times that document feed errors have occurred in succession has reached the previously established number, the flow advances to Step S11. Upon advancing to Step S11, the document conveyance control portion 120 alerts the main control portion 110 that the number of times that document feed errors have occurred in succession has reached the previously established number. Upon being so alerted, the main control portion 110 instructs the image reading control portion 130 to detect whether or not the document D is present on the contact glass 20b. As a result, in the event that the document D is absent from the contact glass 20b, the flow advances to Step 10. On the other hand, in the event that the document D is present on the contact glass 20b, the flow advances to Step 12.

Upon advancing to Step S12, the main control portion 110 determines that a malfunction has occurred in the document set sensor SS. Then, in Step S13, even when the document conveyance control portion 120 has detected the presence of the document D in the document set tray 11, the main control portion 110 does not prompt the paper feed unit 1 to perform document feed (document feed operation by the document feed portion 13), but instead prompts the image reading portion 2 (the image reading control portion 130) to perform stationary reading. Thereafter, in Step 814. The main control portion 110 prompts the operating panel 8 to make notification that a malfunction has occurred in the document set sensor SS (to display the notification screen S2 shown in FIG. 6). Alternatively, notification that a malfunction has occurred in the document set sensor SS may be made in parallel with execution of the stationary read.

In the aforedescribed manner, the image reading device 200 of the present embodiment has contact glass including the contact glass 20a for fed reading (first contact glass) and the contact glass 20b for stationary reading (second contact glass); and the document conveying unit 1 which is reclosably mounted on the upper face of the contact glass, for conveying the document D, and is configured to be capable of executing fed reading by reading an image of the document D passing over the contact glass 20a while fed by the document conveying unit 1, and stationary reading by reading an image of the document D while stationary on the contact glass 20b. The document conveying unit 1 includes the document conveying path 10 for feeding the document D onto the contact glass 20a; the document set tray 11 for setting the document D to be advanced onto the document conveying path 10; the document set sensor SS for the presence or absence of the document D in the document set tray 11; the document conveyance control portion 120 (document set detection portion) connected to the document set sensor SS, for detecting on the basis of the output of the document set sensor SS the presence or absence of the document D in the document set tray 11; the document feed portion 13 that, in the event that the document conveyance control portion 120 detects the presence of the document D when an instruction to execute an image reading job has been issued, initiates a document feed operation in order to advance the document D from the document set tray 11 to the document conveying path 10; and the document conveyance control portion 120 (document feed detection portion) which is connected to the document feed sensor FS for detecting the presence or absence of the document D at the document feed detection position FP to the downstream side in the document feed direction from the document feed portion 13, and which detects the presence or absence of the document D at the document feed detection position FP on the basis of the output of the document feed sensor FS and determines whether or not a document feed error, whereby the document D fails to advance to the document conveying path 10 despite the document feed operation having been initiated, has occurred. The image reading device 200 is moreover provided with the operating panel 8 (reception portion), and the image reading control portion 130 (stationary-reading document detection portion). The operating panel 8 receives an instruction to execute an image reading job. The image reading control portion 130 detects whether or not the document D is present on the contact glass 20b. The image reading control portion 130, in the event that the document conveyance control portion 120 detects the presence of the document D in the document set tray 11 when the operating panel 8 has received an instruction to execute an image reading job, performs fed reading; or in the event that the document conveyance control portion 120 detects the absence of the document D in the document set tray 11, performs stationary reading. Then, once the number of successive occurrences of document feed errors during execution of fed reading has reached a predetermined number of times, the image reading control portion 130 performs stationary reading in cases in which the presence of the document D on the contact glass 20b is detected, even when the document conveyance control portion 120 has detected the presence of the document D in the document set tray 11.

Normally, a user wishing to execute a fed read will set the document D into the document set tray 11, rather than stationing the document D on the contact glass 20b. On the other hand, a user wishing to execute a stationary read will station the document D on the contact glass 20b, rather than setting the document D into the document set tray 11.

Accordingly, in the present embodiment, when the number of successive occurrences of document feed errors reaches the predetermined number of times, it is detected whether or not the document D is present on the contact glass 20b.

At this time, in the event that the document D is present on the contact glass 20b, it is expected that, because a document feed operation was initiated despite the document D not being set into the document set tray 11, the document conveyance control portion 120 will detect the occurrence of a document feed error. Specifically, it is expected that, despite the fact that the document D was not set in the document set tray 11, the document conveyance control portion 120 will detect the presence of the document D in the document set tray 11 (the output level of the document set sensor SS will be at a level indicating that the document D is present). On the other hand, in the event that the document D is absent on the contact glass 20b, it is expected that, because a document feed operation was initiated due to the document D being set into the document set tray 11, but for some reason the document D was not advanced to the document conveying path 10, the document conveyance control portion 120 will detect occurrence of a document feed error. Specifically, it is expected that, due to the document D being set into the document set tray 11, the document conveyance control portion 120 will detect that the document D is present in the document set tray 11 (the output level of the document set sensor SS will be at a level indicating that the document D is present). In so doing, according to the present embodiment, in the event that the document D is present on the contact glass 20b at the time that the number of successive occurrences of document feed errors reaches the predetermined number of times, a malfunction is deemed to have occurred in the document set sensor SS. At this time, stationary reading is performed, despite the fact that the document conveyance control portion 120 detects that the document D is present in the document set tray 11. As a result, instances of an inability to execute stationary reading in cases which a malfunction has occurred in the document set sensor SS can be minimized, thereby improving convenience for the user.

Moreover, according to the present embodiment, in the aforedescribed manner, in the event that, at a time when the number of successive occurrences of document feed errors has reached the predetermined number of times, the image reading portion 2 (the image reading control portion 130) determines the document D to be present on the contact glass 20b, the operating panel 8 (notification portion) issues a notification that a malfunction has occurred in the document set sensor SS (displays the notification screen S2 shown in FIG. 6). In so doing, in cases in which a malfunction has occurred in the document set sensor SS, the user can be made aware of the fact that a malfunction has occurred in the document set sensor SS, thereby improving convenience for the user.

Moreover, according to the present embodiment, in the aforedescribed manner, in the event that the image reading portion 2 (the image reading control portion 130) determines that the document D is absent on the contact glass 20b, the operating panel 8 issues a notification that a document feed error has occurred (displays the notification screen Si shown in FIG. 5). In so doing, the user will be able to quickly initiate a procedure to resolve the document feed error (such as reloading the document D or the like).

Moreover, according to the present embodiment, in the aforedescribed manner, when the document conveyance control portion 120 has not detected the presence of the document D at the document feed detection position FP despite the elapse of a previously established prescribed time interval from initiation of the document feed operation, the document feed portion 13 performs a retry operation whereby the document feed operation is temporarily halted, and the document feed operation resumed thereafter. Then, when the presence of the document D at the document feed detection position FP has not been detected even after the number of successively executed retry operations has reached a predetermined number, the document conveyance control portion 120 determines a document feed error to have occurred. Here, despite the document D having been set into the document set tray 11, in the event of wear of the document feed portion 13 (the pickup roller 13a or document feeding belt 13b), or of paper dust deposited on the document feed portion 13, there are instances in which the document D fails to be advanced onto the document conveying path 10 through a single document feed operation, whereas the document D can be advanced onto the document conveying path 10 through successive repetition of the document feed operation. Consequently, a configuration whereby a document feed error is determined to have occurred, when the presence of the document D at the document feed detection position FP has not been detected despite the number of successively executed retry operations having reached a predetermined number, is preferred.

Moreover, according to the present embodiment, in the aforedescribed manner, the image reading control portion 130, on the basis of image data obtained through reading of an image on the contact glass 20b, detects whether or not the document D is present on the contact glass 20b. For example, the image reading control portion 130 makes reference to image data for document size detection, acquired during document size reading, to detect whether or not the document D is present on the contact glass 20b. In so doing, it can readily be detected whether or not the document D is present on the contact glass 20b.

The embodiments disclosed herein are in all respects merely exemplary, and should not be construed as limiting. The scope of the present disclosure is shown by the claims and not by the foregoing description of the embodiments, and all modifications equivalent in significance within the scope of the claims are encompassed therein.

What is claimed is:

1. An image reading device comprising:
   a contact glass;
   an image reading control portion which executes fed reading for reading an image of the document passing over the contact glass while fed by a document conveying unit or stationary reading for reading an image of the document while stationary on the contact glass,
   the document conveying unit which conveys a document, the document conveying unit openable and closable mounted on the upper face of the contact glass,
   the document conveying unit including:
   a document conveying path for feeding the document onto the contact glass;

a document set tray which is set the document to be fed onto the document conveying path;

a document set detection portion which detects the presence or absence of the document in the document set tray;

a document feed portion which feeds the document from the document set tray to the document conveying path; and a document feed detection portion which detects the presence or absence of the document at a document feed detection position to the downstream side in the document feed direction from the document feed portion;

a reception portion which accepts an instruction to execute the image reading job;

a stationary-reading document detection portion which detects whether or not the document is present on the contact glass, wherein the image reading control portion that, when the reception portion accepts the instruction to execute the image reading job, on a condition that the document set detection portion detects the presence of the document, performs fed reading, and on a condition that the document set detection portion detects the absence of the document and the stationary-reading document detection portion detects the presence of the document, performs stationary reading, once the number of successive occurrences of a document feed error during execution of the fed reading has reached a predetermined number, the image reading control portion performs stationary reading, in the event that the stationary-reading document detection portion detects the presence of the document, even when the document set detection portion detects that the document is present.

2. The image reading device according to claim 1, further comprising a notification portion for notification of the status of the image reading device, wherein the notification portion issues notification that a malfunction has occurred in the document set detection portion, in the event that the stationary-reading document detection portion detects the presence of the document, when the number of successive occurrences of the document feed error has reached the predetermined number.

3. An image forming device comprising the image reading device according to claim 2.

4. The image reading device according to claim 1, further comprising a notification portion for notification of the status of the image reading device, wherein the notification portion issues notification that the document feed error has occurred, in the event that the stationary-reading document detection portion detects the absence of the document.

5. An image forming device comprising the image reading device according to claim 4.

6. The image reading device according to claim 1, wherein when the document feed detection portion has not detected the presence of the document at the document feed detection position despite elapse of a prescribed time interval from initiation of the document feed operation, the document feed portion performs a retry operation whereby the document feed operation is temporarily halted and the document feed operation subsequently resumed, and the image reading control portion determines the document feed error to have occurred, when the presence of the document at the document feed detection position has not been detected, despite the number of times of successive execution of the retry operation reaching a prescribed number.

7. An image forming device comprising the image reading device according to claim 6.

8. The image reading device according to claim 1, wherein the stationary-reading document detection portion detects whether or not the document is present on the contact glass, on the basis of image data obtained by reading an image on the second contact glass.

9. An image forming device comprising the image reading device according to claim 8.

10. An image forming device comprising the image reading device according to claim 1.

* * * * *